United States Patent [19]
Eischen et al.

[11] Patent Number: 5,618,426
[45] Date of Patent: Apr. 8, 1997

[54] LATERAL MEMBER ASSEMBLY FOR UNDERDRAIN LATERAL SYSTEM

[75] Inventors: Frederick W. Eischen, Stacy; Stephen A. Uban, Stillwater; Richard C. Maxson, Maple Grove, all of Minn.

[73] Assignee: Wheelabrator Water Technologies Inc., New Brighton, Minn.

[21] Appl. No.: 490,656

[22] Filed: Jun. 15, 1995

[51] Int. Cl.$^6$ ................................................ B01D 24/38
[52] U.S. Cl. ........................... 210/541; 210/289; 210/291
[58] Field of Search ............................. 210/274, 275, 210/279, 289, 291, 293, 541; 239/589, 596

[56] References Cited

U.S. PATENT DOCUMENTS

| | | | |
|---|---|---|---|
| 1,926,843 | 9/1933 | Fischer | 137/75 |
| 3,707,846 | 1/1973 | Leblond et al. | 61/45 R |
| 4,068,713 | 1/1978 | McGuire | 166/233 |
| 4,096,911 | 6/1978 | Geske | 166/234 |
| 5,118,419 | 6/1992 | Evans et al. | 210/291 |
| 5,156,738 | 10/1992 | Maxson | 210/274 |
| 5,275,506 | 1/1994 | Grimsley | 405/43 |

*Primary Examiner*—Ivars Cintins
*Attorney, Agent, or Firm*—Barry L. Clark

[57] ABSTRACT

Lateral member assembly for use in an underdrain lateral distribution system is made of plastics but is as capable as much heavier and more costly prior art metallic assemblies in supporting a bed of filter media which must be periodically backwashed with liquid and gas. Complementary elements, including a rigid extruded floor plate member having longitudinally extending side edge channels, and an overlying screen member having flange portions adapted to be retained by undercut recesses in the side edge channels, are adapted to be assembled to each other to form hollow lateral assemblies. In a preferred embodiment, the screen member is telescopically assembled to the floor plate member to cause the screen flange portions to interlock with the recesses in the side edge channels. The resulting assembly is sealed against leakage where the members are interlocked by a pair of flexible, integral plastic sealing strips which are co-extruded with the rigid floor plate member. In an alternative arrangement, the flange portions of the screen members engage a cam surface on the floor plate member which forces them away from each other as the screen member is pressed down against the floor plate member, thus causing them to snap into the undercut recesses in the side edge channels. The flange portions are then retained in a locked relationship with the floorplate member and sealed by flexible rod members forced into the space between the outside surfaces of the screen member and the outer walls of the side edge channels.

10 Claims, 3 Drawing Sheets

LATERAL MEMBER ASSEMBLY FOR UNDERDRAIN LATERAL SYSTEM

BACKGROUND

1. Field of Invention

This invention pertains to underdrain lateral systems, such as those of the type utilized in a gravity filter bed.

2. Related Art and other Considerations

U.S. Pat. No. 5,156,738 to Maxson, incorporated herein by reference, illustrates an underdrain lateral system of the type having a curved distributor member or screen which is situated above a flat baseplate. As illustrated in the Maxson patent and is understood by those skilled in the art, the underdrain lateral system is positioned below a media bed, such that liquid, usually water, exiting overflow troughs above the media bed pass through the media. During normal operation, water which has passed through the media bed falls into the underdrain lateral system, and particularly into upper concave surfaces of the screen. The upper concave surface of the screen has perforations such as thin slots which are sized so as to retain particles which make up the media bed. Water passing through the screen is subsequently discharged from the underdrain lateral system. As opposed to normal operation, a backwash mode is utilized to clean the media. In the backwash mode, water and air are directed upwardly through the screen perforations and media bed in a uniform manner so that the material previously filtered out and captured by the media bed will be picked up and carried upwardly where it will be discharged through the overflow trough.

The underdrain lateral system shown in the Maxson patent is formed of stainless steel and has its screen portion situated between two up-turned, side edge portions of its elongated flat baseplate. Its screen portion is formed by helically winding and welding a metal wire to a channel base support as described in Geske U.S. Pat. No. 4,096,911. Screens and baseplates which form lateral member assemblies for underdrain lateral systems can be quite large, often measuring as long as 30 feet, but more typically, are about 20 feet. In the prior art, such lateral member assemblies were formed of metal, and accordingly were not only heavy to transport but quite cumbersome, because of their weight, to assemble with other units at the point of use. Furthermore, where the assemblies were to be used with seawater or brackish water, they were quite subject to corrosion, even when fabricated of stainless steel. Also, since stainless steel is quite expensive, the baseplates of metal units are usually relatively thin, allowing them to bow during use unless a substantial number of holddown bars are provided to maintain them in place and flat against the floor. Since considerable labor is required to mount the holddown bars with bolts to the concrete floor of the filter bed, it can be appreciated that a lateral unit requiring fewer holddown bars would be quite desirable.

SUMMARY

It is an object of the present invention to provide a lateral assembly which will be far less costly and much lighter in weight than previously used metal units and yet capable of withstanding the weight of the media bed and the various pressures of water and air present at different times during the collection and backwash cycles.

It is a further object to provide a lateral assembly which is more resistant to corrosion than metal screens, sufficiently rigid to require fewer holddowns, and has its screen and base sealed in such a way as to allow flexing under load to reduce stresses and dissipate the water hammer effects produced by any sudden opening and closing of valves which control the flow of water and air in the system.

These and other objects are attained by the lateral assembly of the present invention wherein a channel based plastic screen member having inwardly directed flange portions on its side edges is retained by recessed slots in a vertical channel formed in the edges of a rigid, extruded plastic baseplate member. In a preferred embodiment, the screen and baseplate are telescopically assembled to each other and sealed with flexible plastic strips which are co-extruded with the rigid baseplate member. In a modified embodiment, the screen flange portions are forced down over cam surfaces on the inner side walls of the baseplate channels until they snap into the recessed slots. They are then sealed and retained by elongated plastic rods pressed into the space between the outside channel walls and the edge of the screens.

DETAILED DESCRIPTION OF THE DRAWINGS

The present invention provides embodiments and modes of inserting a screen portion of a lateral member assembly into a baseplate portion of the lateral member assembly. The embodiments of the present invention are preferably and advantageously fabricated from plastic, and preferably from PVC plastic.

Figure 1:
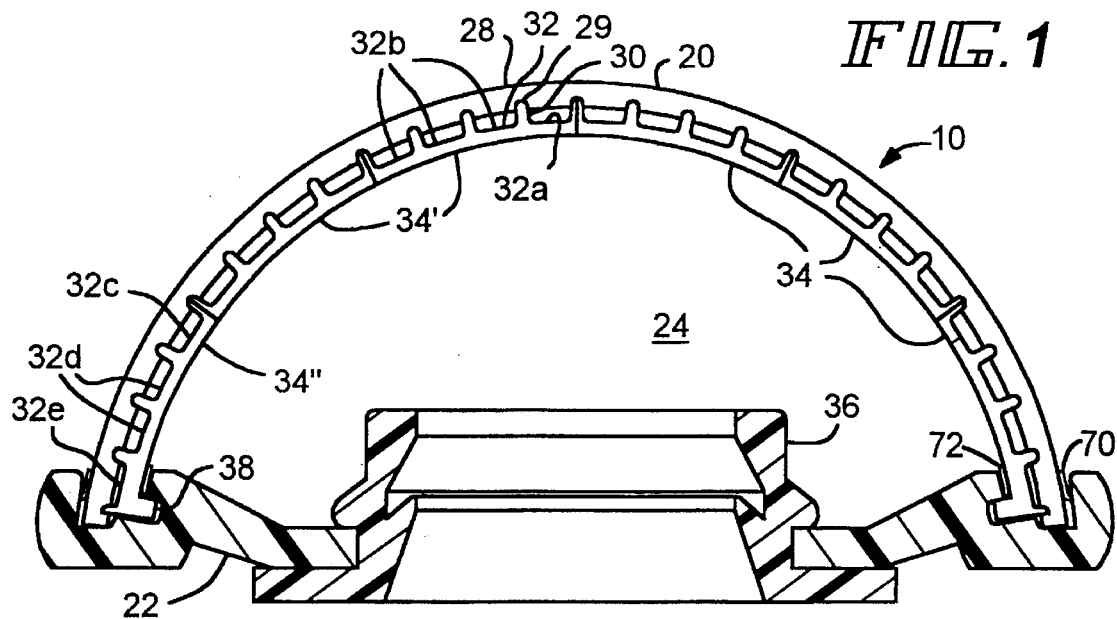
FIG. 1 is a cross-sectional view taken on line 1—1 of FIG. 2 showing a lateral member assembly according to a first embodiment of the invention for use in an underdrain lateral distribution system.
Figure 2:
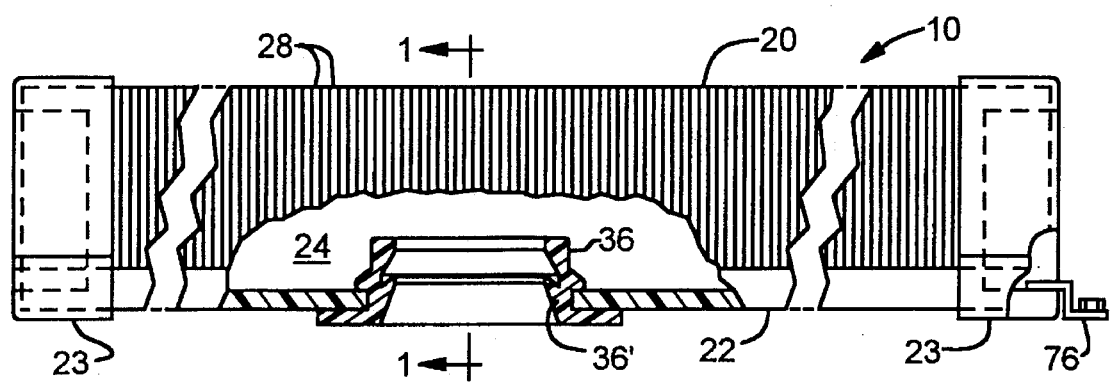
FIG. 2 is a fragmentary, partially broken away side view of the lateral member assembly of FIG. 1.

FIGS. 1 and 2 show a lateral member assembly indicated generally at 10 according to a first embodiment of the invention. Lateral member assembly 10 has a tubular shape and preferably includes a curved screen member 20 and a rigid extruded baseplate member 22 and is closed at its ends by molded plastic end cap members 23. Curved screen 20 has the geometrical shape of a sector of a hollow cylinder, so that a semicircular open region 24 is formed between screen 20 and baseplate 22. Screen 20 has a central axis which runs parallel to arrow 26 in FIG. 4 (i.e., perpendicular to the sheet of FIG. 1 ). Screen 20 preferably includes a plurality of closely spaced plastic wires 28 which are welded at each of their intersections 29 to a plurality of radially outwardly extending extruded channel ribs 30 to define narrow slots 31 for the retention of media and collection of filtered liquid. The channel ribs 30 define a plurality of channel portions 32 formed in screen an inner support portion comprising segments 34. Most of the channel portions 32 have inner perforated web portions containing small openings 35 (FIG. 4) which cooperate with each other to form a flow distribution system for uniformly controlling the flow of water and air which enters through the fitting seal 36 during the backwash operation. The fitting seal 36 is preferably made of nitrile or neoprene rubber and is mounted in a hole 36' in the center of the baseplate 22. The purpose and positioning of these openings 35 is to ensure that there is more of an open area for flow in the bottom half of the screen opening 24 as compared to the top half as is well explained in the Maxson patent. Although the hole pattern of the openings 35 is not visible in the drawings, the holes are preferably about 0.125" in diameter. In FIG. 1, three support segments 34 are provided on either side of the center of the screen with each segment including four integral channels 32. In the two upper support segments 34', the uppermost channels 32a preferably have no holes while the three lowermost channels 32b each have two holes per foot of length of the lateral member. In the lower support segments 34", the uppermost channel 32c has two holes per foot, the next two channels 32d have eight holes per foot and the lowermost channel 32e has no holes. At its side edges 37, which run parallel to arrow 26, screen 20 has radially inwardly directed support flange portions comprising elongated projections 38 formed at the bottom of the lower support segment 34".

Figure 3:
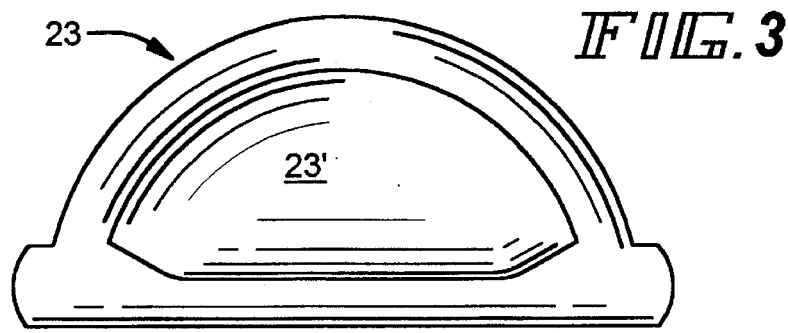
FIG. 3 is an end view showing one of the end caps which cover the ends of the lateral member assembly shown in FIG. 2.
Figure 4:
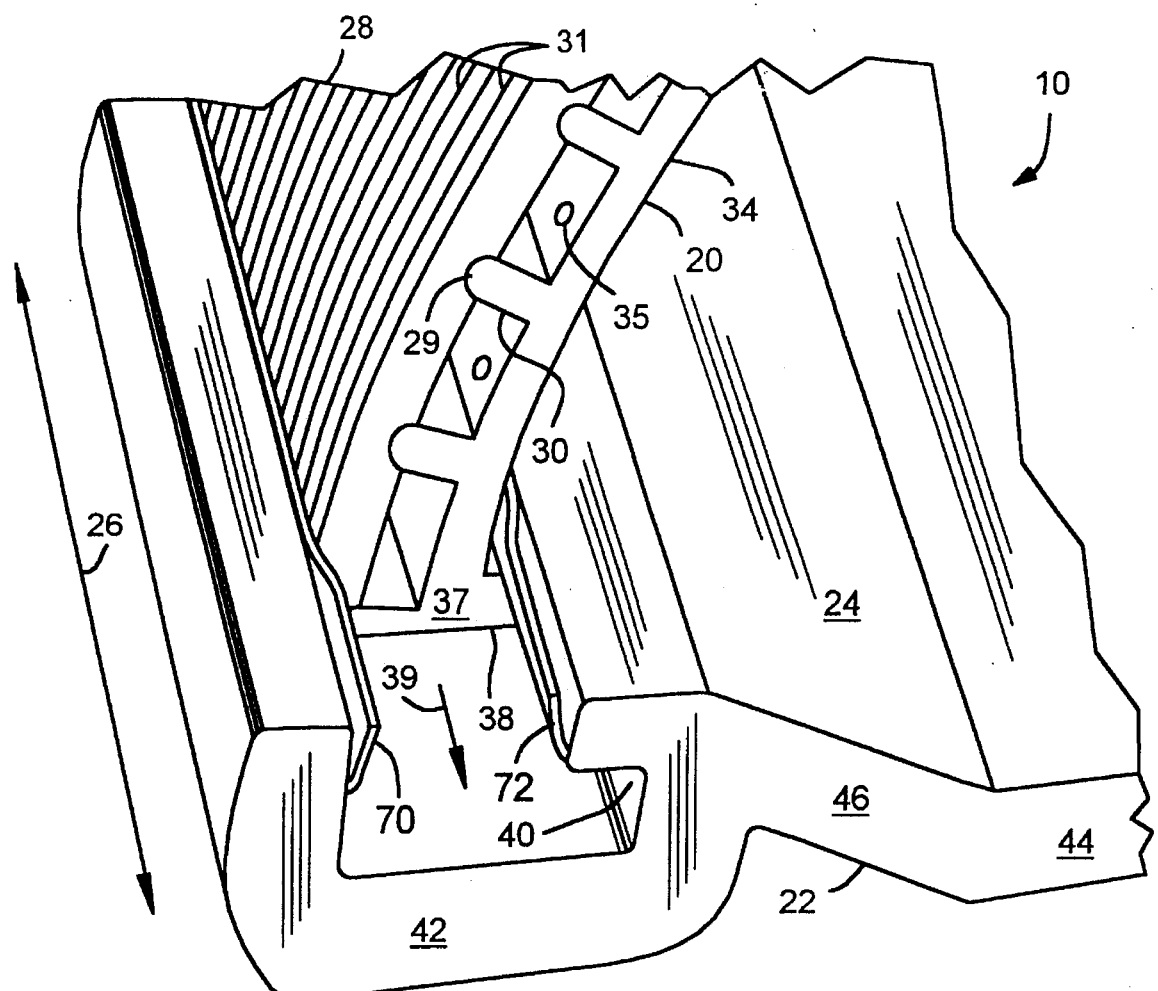
FIG. 4 is a perspective view of a portion of the lateral member assembly of FIG. 1, showing a screen being telescopically slid into interlocking position relative to a baseplate.

FIGS. 2 and 3 show an end cap member 23 which is molded of PVC and has a groove formed around its interior which is adapted to overlie and surround the ends of the screen 20 and baseplate 22. The end caps are preferably attached to the members 20 and 22 with PVC cement. As best seen in FIGS. 1 and 4, baseplate 22 is configured to engage screen support flange portions 38 in such a manner that screen member 20 can be slid longitudinally into interlocking engagement with baseplate member 22. FIG. 4 shows screen member 20 being longitudinally slid into baseplate 22 in the direction of arrow 39. To accommodate the support flange portions 38 of screen 20, baseplate 22 is provided with a pair of recessed slot portions 40 which are complementary to the flange portions 38. In addition to the recessed slot portions 40 which are formed in the side edge portions 42, baseplate 22 is contoured to have a flat central portion 44. Contiguous with either side of baseplate central portion 44 are baseplate ramp portions 46 which form a bridge or ramp between the central portion 44 and the side edge portions 42. The ramp portions 46 cooperate with the central portion 44 to increase the stiffness of the baseplate 22 and make it far more resistant to bending than prior art metal baseplates such as shown in the Maxson patent. In a preferred embodiment, the cross-sectional thickness of the baseplate is about 0.38" in its central portion 44 while the radial thickness of the screen member 20 is about 0.5".

Figure 5:
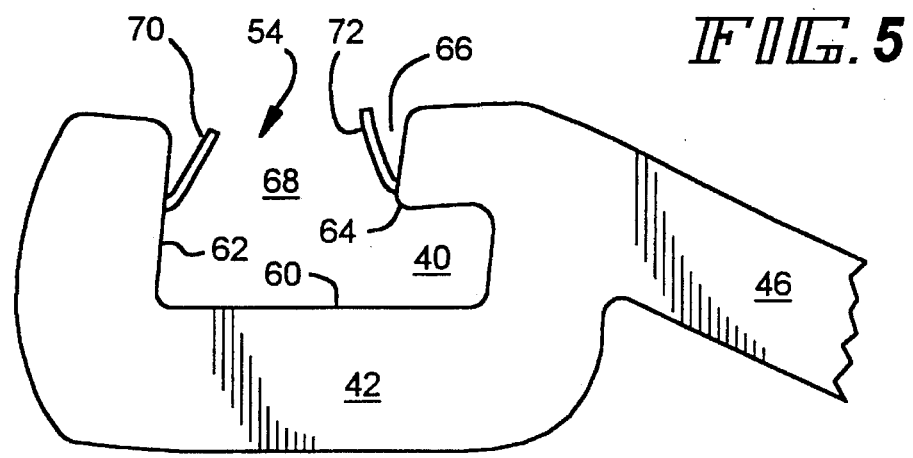
FIG. 5 is an end view of the baseplate portion of the lateral member assembly of FIG. 1.

In FIG. 5, the recessed slot portion 40 of baseplate 22 is shown in more detail. It is formed as part of the vertically upwardly extending channels 54 which include channel bottom wall 60, outer side wall 62 and inner side wall 64. The recessed slot portion 40 forms an undercut portion in the inner wall 64 below the upper lip portion 66. The open interior space 68 of the channels 54 is sized to be larger than the flanged portions 38 and the side edge portions 37 of the screen member 20 to facilitate the longitudinal insertion of the side edge portions 37 into the channels 54. Since the lateral assemblies 10 are typically twenty or more feet in length, and over ten inches in width, we prefer to assemble them by mounting the screen member 20 in a fixture (not shown) on a table (not shown) while using a pneumatic cable assembly (not shown) to push the baseplate member 22 into telescoping engagement with the screen member 20. Since there must necessarily be a rather loose 1it between the screen member 20 and the baseplate 22 to accommodate the assembly operation, a sealing means is provided to prevent leakage of unfiltered liquid into the interior space 24. The sealing means includes flexible elongated sealing strips 70 and 72 which are preferably formed of a flexible PVC material such as that sold under the trademark Geon® 7000 produced by the B F Goodrich Company. The flexible PVC sealing strips 70 and 72 are co-extruded with, and thus integral with, the baseplate member 22 which is preferably foraged of a rigid PVC material sold under the name GEON® 8700. The screen wires 28 and channeled support segments 34 which comprise the screen member 20 are also preferably made of PVC material. The sealing strips 70, 72 each extend upwardly and inwardly into the interior space 68 and are sufficiently long that they will be flexed into a more vertical position as they are engaged by the side edges 37 of the screen during the assembly operation. The outer strip 70 will tend to be forced downwardly into contact with the outer surface of the screen member 20 during normal operation when water is being collected by the lateral since the water pressure is higher above the lateral than inside it. During backwash, the pressure of the water and air inside the screen interior 24 will tend to hold the inner sealing strip 72 in engagement with the inner surface of the screen.

Figure 6:
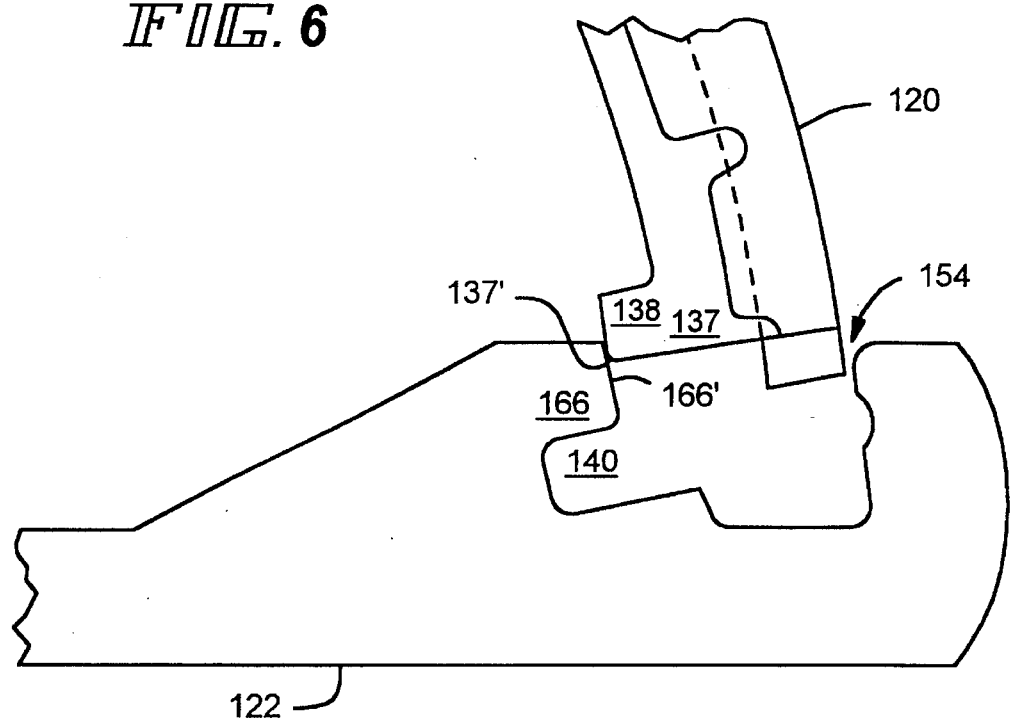
FIG. 6 is an end view similar to FIG. 4 but showing a second embodiment of the invention wherein the screen member is about to be forced downwardly against the baseplate member to lock the two members together.
Figure 7:
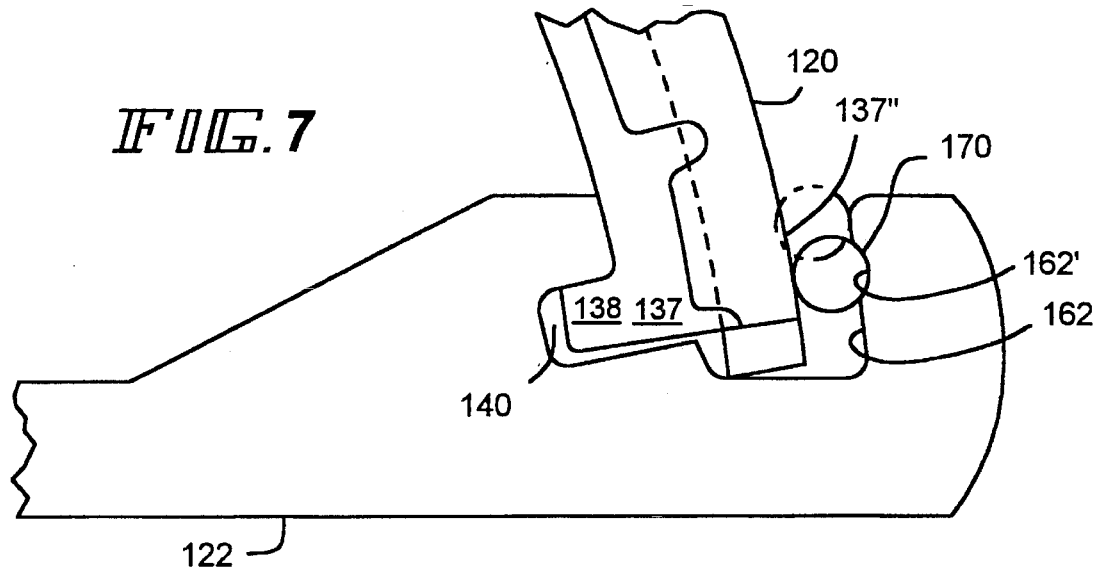
FIG. 7 is an end view similar to FIG. 6 but showing the members after they have been snapped together.

FIGS. 6 and 7 show a second embodiment of the invention in which the screen member 120 is adapted to be assembled to the baseplate member 122 by pressing the side edge portions 137 downwardly into the vertically upwardly extending channels 154. The upper lip portion 166 is formed to include an angled cam surface 166' which will contact the lower corner surface 137' of the side edge portion of screen member 120 and force it to move progressively outwardly until it has moved past the lip portion 166, at which point it will snap back to its normal position. At this point, the radially inwardly directed flange portions comprising elongated projections 138 will be positioned in the recessed slot portions 140. Since the channels 154 must be sufficiently wide to accommodate the outward movement of the screen edge portions 137, a sealing and retaining means in the form of a flexible rod member 170, preferably formed of plastic or rubber, is forced downwardly into the space between the channel outer wall 162 and the outer wall 137" of the screen member 120. A groove 164' formed in the channel inner wall locks the rod member 170 in place and enhances the seal.

A particular advantage of the lateral assembly of the present invention is that it requires much less in the way of installation time and materials to anchor it in position than the metal lateral assembly shown in the Maxson patent. For example, for a twenty foot length of lateral, four holddown bars anchored in the concrete floor of the filter with ⅜" bolts would be needed for the Maxson metal lateral assembly since the relatively thin baseplate member can tend to bow under the pressure exerted on the inside of the assembly during backwashing. The rigidity of the baseplate 22, 122 of the present invention, which is enhanced by the angled connecting portion 46, is sufficient that such a holddown bar would only normally be required at the center of the lateral. A holddown bar is required at this position since it overlies the location of the fitting 36 (FIG. 2) which brings in water and air during backwash. These fluids impinge on the upper inside surface of the screen member with substantial force and tend to lift it. The ends of the lateral assembly can be held to the floor with simple clips 76 which can be anchored quickly with explosive fasteners rather than with large bolts. The clips can engage either the lower edge of the end caps 23 or the upper outer surfaces of the side edge portions 42. Another advantage of the plastic lateral assembly as compared to stainless steel is that materials such as anti-fouling agents such as fungicides or bacteriostatic materials such as copper should be able to be mixed into the plastics used to make the lateral before they are extruded in order to give the lateral properties which cannot be achieved in a metal screen.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An elongated lateral member assembly for use in an underdrain lateral distribution system which is adapted to be positioned generally horizontally beneath a bed of granular media which must be periodically backwashed with fluids, the elongated lateral member assembly comprising an elongated generally flat baseplate member and an elongated screen member having an upwardly directed media retaining portion and being mounted at its elongated side edges to elongated side edge portions of said baseplate, the baseplate member being formed of a rigid extruded plastic, said screen member having an inner support portion comprising a plurality of extruded plastic channel-shaped members which have inner perforated web portions and elongated, radially outwardly extending outer rib portions to which a plurality of plastic wires are welded in a direction generally normal to the direction of the outer rib portions so as to form a plurality of narrow slot-shaped openings, elongated projections formed on a pair of said plurality of channel-shaped members which define the opposed elongated side edges of said screen member, said elongated projections extending generally radially inwardly toward each other along the length of said screen member, said elongated baseplate member having generally vertically extending channels formed in the upper surface of its opposed side edges and extending along the length thereof, the opposed elongated side edges of said screen member being mounted in said channels, each of said channels in said baseplate member having inner and outer spaced apart walls, with the inner wall having an inwardly extending recessed slotted portion spaced from the top surface of said inner wall, said slotted portion being complementary to and serving to retain the elongated projection formed on one of the opposed side edges of said screen member against upward movement, and at least one elongated, flexible sealing means positioned between at least one wall of each of the vertically extending channels and a surface of said screen member.

2. An elongated lateral member assembly in accordance with claim 1 wherein the opposed side edges of said screen member and the channels in the side edges of said baseplate member have an elongated complementary cross-sectional shape in the edge regions where they are retained against upward relative movement relative to each other such that they can be telescopically assembled to each other.

3. An elongated lateral member assembly in accordance with claim 2 wherein said elongated flexible sealing means comprises a pair of flexible strips of plastic which are integral with the vertical walls of said channels in said baseplate member, said flexible strips of plastic extending generally upwardly and toward each other so as to contact the inner and outer surfaces of the screen member.

4. An elongated lateral member assembly in accordance with claim 3 wherein said pair of flexible strips of plastic are integral with the rigid plastic baseplate member.

5. An elongated lateral member assembly in accordance with claim 4 wherein said flexible strips of plastic and said rigid plastic baseplate are formed from different types of PVC plastic.

6. An elongated lateral member assembly in accordance with claim 1 wherein the inner walls of said channels in said baseplate member which are located immediately above said inwardly extending recessed slotted portions are formed at an angle to the vertical which permits the elongated projections on the opposed side edges of the screen member to be progressively moved away from each other when a downward force is applied to the screen member during an operation of assembling it to the baseplate member, said screen member being sufficiently resilient as to cause said elongated projections to snap into said recessed grooved portions after being moved downwardly along the said inner walls of said channels.

7. An elongated lateral member assembly in accordance with claim 6 wherein each of the outer walls of said channels formed in said baseplate member has an undercut groove therein which serves to retain an elongated flexible sealing member.

8. An elongated lateral member assembly in accordance with claim 1 wherein the vertically extending channels formed in said baseplate member are sufficiently wide to accommodate the downward passage of said elongated projections during vertical assembly of the screen member to said baseplate member, and an elongated flexible member which is adapted to be positioned in the outer portion of each of said channels to force the inside edges of the screen member toward the inner walls of the channels after said screen member has been assembled to said baseplate member so that the elongated projections on said screen member are retained by said recessed portions on said baseplate member, said elongated flexible members providing a seal between said screen member and the outer walls of said baseplate channels.

9. An elongated lateral member assembly in accordance with claim 1 wherein the ends of said lateral member assembly are closed by molded plastic end caps which include an internal groove which surrounds both the screen member and the baseplate member.

10. An elongated lateral member assembly in accordance with claim 1 wherein said baseplate member includes a flat central bottom portion and upwardly angled connecting portions joining said central portion to said side edge portions.

* * * * *